Feb. 10, 1970   J. FARMER   3,494,398
PINEAPPLE TREATING APPARATUS
Original Filed Jan. 21, 1961   6 Sheets-Sheet 1
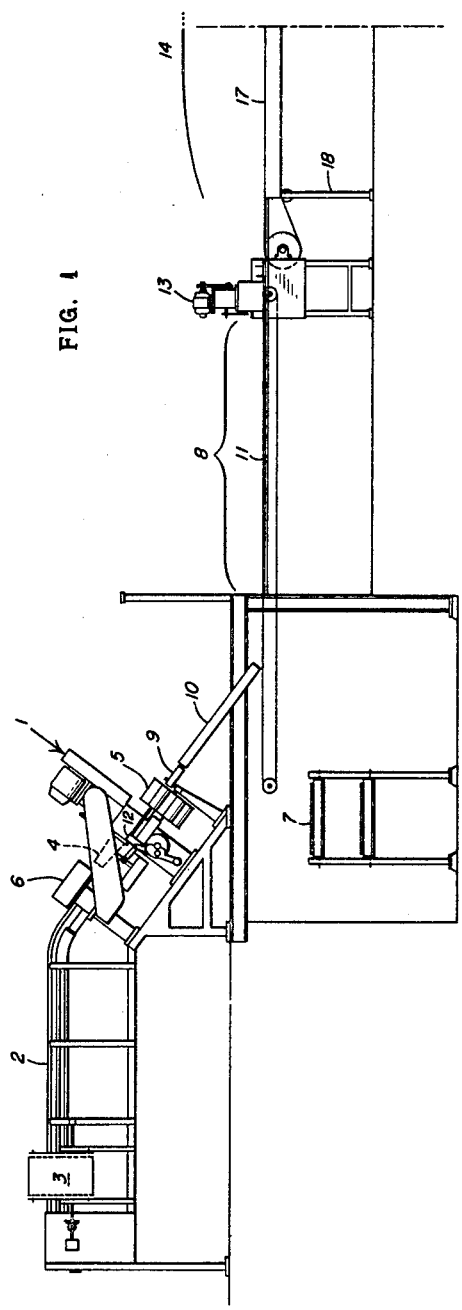
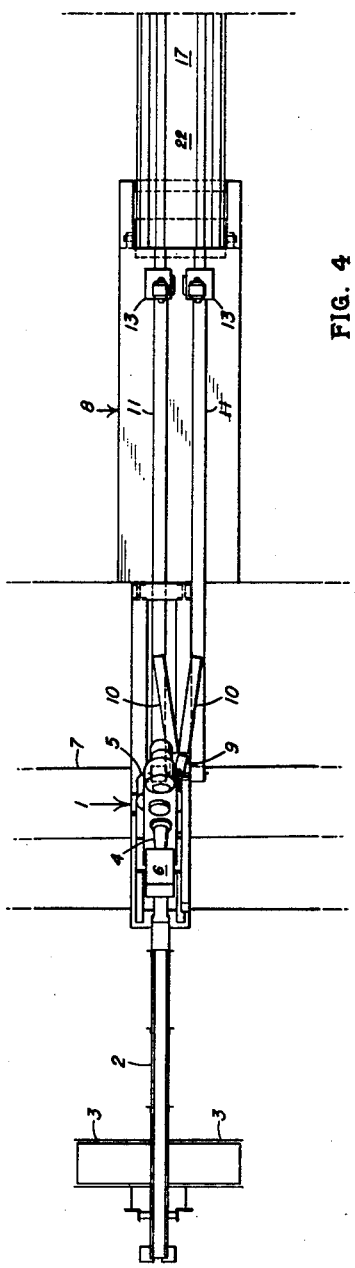
Inventor:
John Farmer

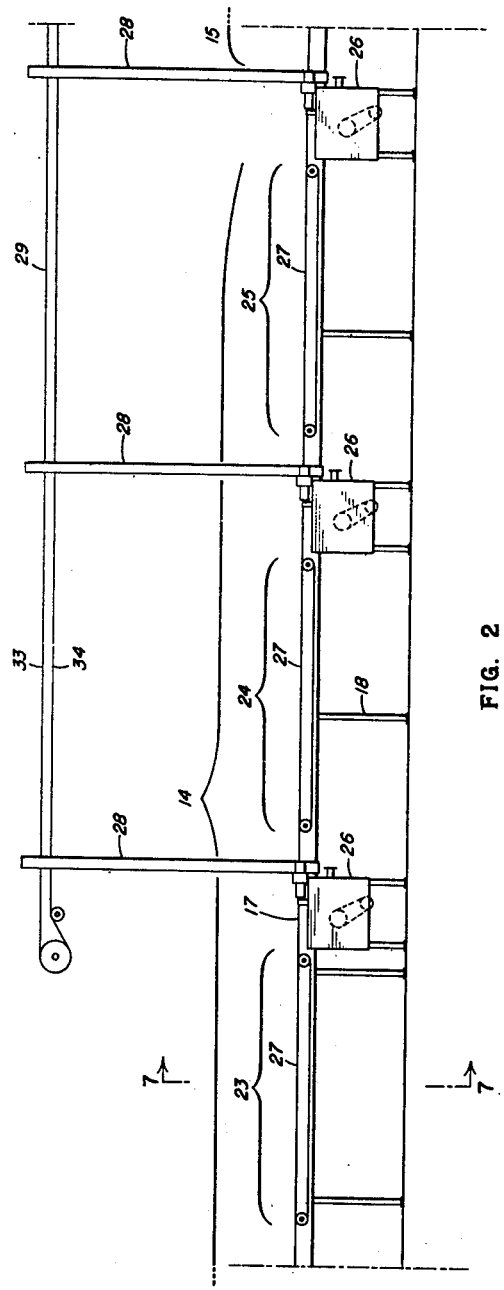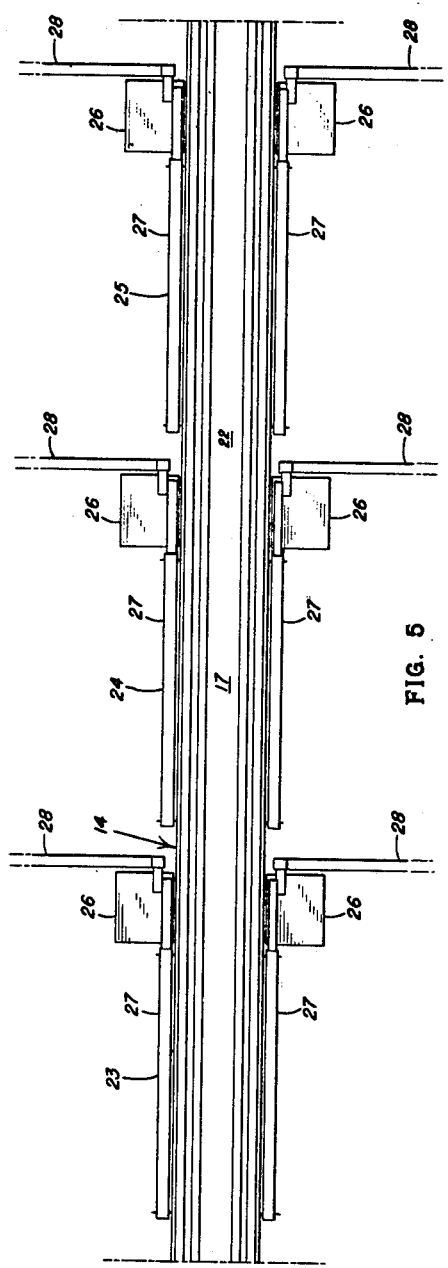

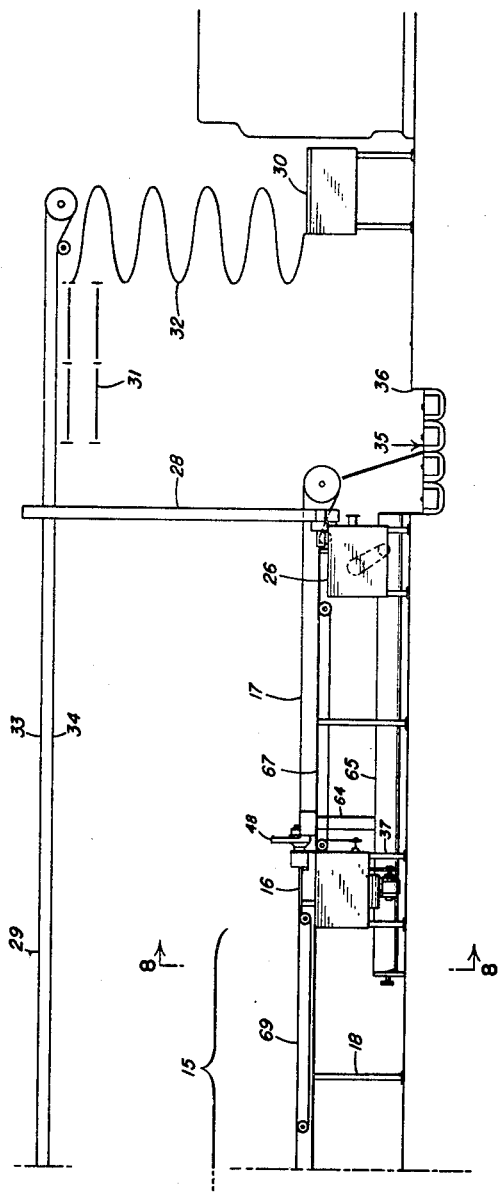
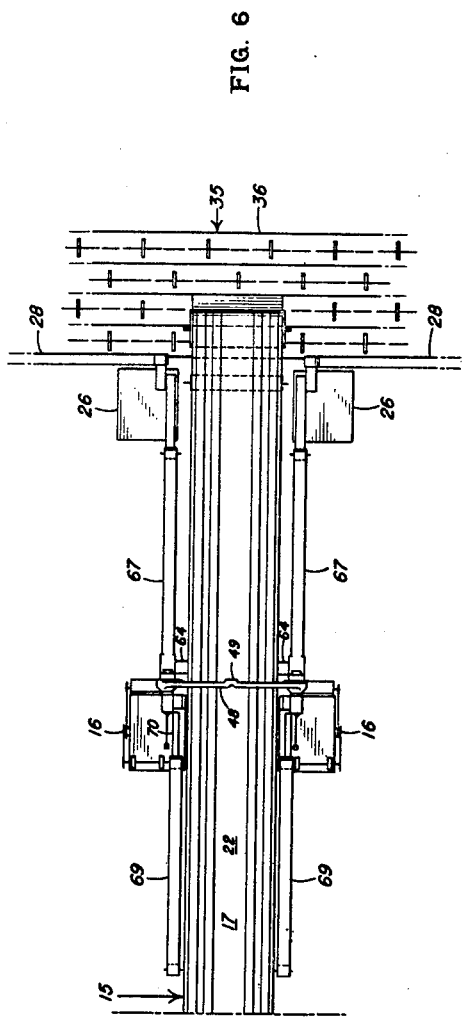

Feb. 10, 1970   J. FARMER   3,494,398
PINEAPPLE TREATING APPARATUS
Original Filed Jan. 21, 1961   6 Sheets-Sheet 4

Inventor:
John Farmer

Inventor: John Farmer

Feb. 10, 1970   J. FARMER   3,494,398
PINEAPPLE TREATING APPARATUS
Original Filed Jan. 21, 1961   6 Sheets-Sheet 6
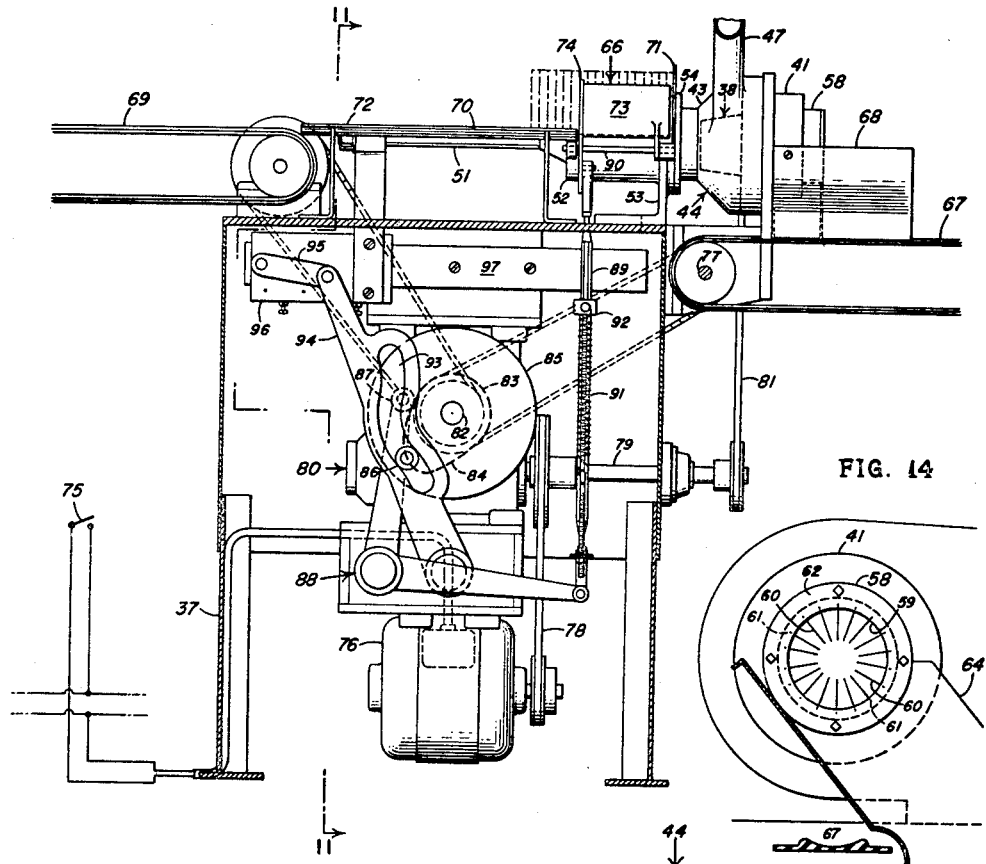
FIG. 12
FIG. 13
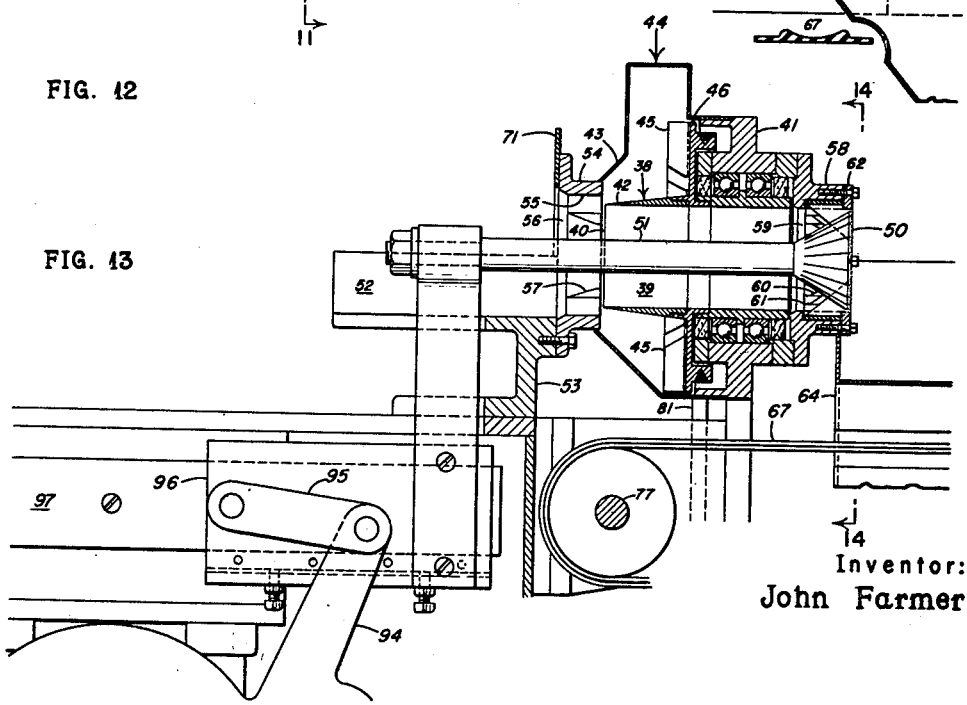
FIG. 14
Inventor:
John Farmer

United States Patent Office 3,494,398
Patented Feb. 10, 1970

3,494,398
PINEAPPLE TREATING APPARATUS
John Farmer, Honolulu, Hawaii, assignor, by mesne assignments, to Ward Foods, Inc., New York, N.Y., a corporation of New York
Continuation of application Ser. No. 82,240, Jan. 21, 1961. This application Apr. 15, 1968, Ser. No. 721,367
The portion of the term of the patent subsequent to May 29, 1979, has been disclaimed
Int. Cl. A23m 15/00
U.S. Cl. 146—6                           10 Claims

ABSTRACT OF THE DISCLOSURE

Apparatus for increasing the solid pack recovery from pineapples, having as its principal components machines for sequentially sizing pineapples, slicing the sized pineapple into slices, and resizing slices having peripheral imperfections for recovering therefrom clean slices of smaller diameter suitable for the solid pack.

---

This application is a continuation of my application Ser. No. 82,240 filed Jan. 21 1961, through my copending application Ser. No. 611,183 filed Sept. 8, 1966, both now abandoned. This invention relates to apparatus for treating pineapples.

Conventionally, a pineapple is prepared for canning by sizing, coring and end cutting it on a Ginaca machine with incidental eradication of usable fruit from the shell and ends, trimming the cylinder from the Ginaca machine to remove eyes, skin traces or other useless portions, slicing the trimmed cylinder into slices, inspecting the slices and sorting them by grade into fancy, choice, standard and salvage slices and packing the fancy choice and standard slices into open-topped cans. The filled cans are then moved to syrupers for adding syrup and seamers for vacuum sealing the cans after their covers have been applied. Subsequently, the sealed cans pass through cookers and after cooling have labels appropriate to the quality of their contents applied and are ready for shipment to the market. At present, the sorting and loading of the slices into cans, as well as the trimming of the cylinders before slicing, are conducted manually. The handling of the cans, too, is laborious, the cans being placed empty on trays of different colors, each of which identifies a particular grade of slices, and remaining on those trays until delivered to the syruper and the trays being transported to and from the loading station on pushcarts.

Since, in the conventional process, the pineapples are sized but once and to a single compromise size suitable for the particular crop being prepared for canning, any slices unsuitable in their entireties for canning as fancy, choice or standard grade are discarded to the crushed or juice pack, along with the fruit eradicated at the Ginaca machine. As explained in my copending application, Ser. No. 63,451, filed Oct. 17, 1960, I have discovered that the yield available to the more profitable solid pack can be increased tremendously by resizing to a smaller size available for solid packing, salvage slices having imperfections only in their peripheral portions and that by controlling the initial sizing and end cutting and the subsequent sizing, trimming can be eliminated with a tremendous saving in the labor required for the process. I have further discovered that it is possible drastically to reduce not only the labor required in the conventional process for loading slices into cans, but also that required to transport the cans to and from the loading station and, with the latter, the numerous trays and carts required for such handling.

The primary object of the present invention is to provide apparatus for treating pineapples whereby pineapples are initially sized and, after slicing and sorting, certain of the salvage slices are resized to make them available for the solid pack as slices of smaller size or tidbits.

Another object of the invention is to provide apparatus for treating pineapples whereby, after an initial sizing with accompanying end cutting and coring and eradication of fruit from the shell, a pineapple is sliced and, thereafter, certain of the slices having imperfections in their peripheral portions are resized to remove the imperfections and enable them to be packed as part of the solid pack.

Yet another object of the invention is to provide apparatus for treating pineapples whereby the manual handling incident to trimming in the conventional process is eliminated and that required for sorting, inspecting and loading cans with pineapples slices is drastically reduced.

An additional object of the invention is to provide apparatus for treating pineapples whereby pineapples are initially sized to substantially the maximum diameter of the fruit inside the skin and the end cuts are held to a minimum, thereby minimizing the fruit removed with and any advantage in eradicating the butt and crown cuts and, by eliminating trimming and resizing selected slices, obtaining a maximum solid pack recovery with a minimum of labor.

A further object of the invention is to provide in apparatus for treating pineapples an improved conveyor system of such construction and arrangement that slices can be inspected and sorted at one or more stations with ease and a minimum of labor.

Another object of the invention is to provide in apparatus for treating pineapples a conveyor extending the length of the apparatus for transporting pineapples therethrough and of such construction and arrangement as to simplify handling of the pineapples at the various stages of their treatment.

Another object of the invention is to provide in apparatus for treating pineapples a conveyor system for conveying pineapples from a Ginaca machine to a syruper and seamer with a minimum of manual handling en route.

A further object of the invention is to provide apparatus for trimming pineapples whereby pineapple slices after inspection and sorting are automatically loaded into cans and delivered without manual handling for syruping and seaming.

Another object of the invention is to provide apparatus for treating pineapples whereby pineapples are transported from a sizing machine through one or more inspection and sorting stations and automatic loaders and resizing machines to an associated syruper and seamer by a series of conveyors and with a minium of handling.

Another object of the invention is to provide in apparatus for treating pineapples a machine for resizing selected salvage slices to make a substantial part of the edible fruit therefrom available for solid pack canning as smaller slices or tidbits.

A further object of the invention is to provide in apparatus for trimming pineapples a resizing machine which may be operated in part or whole either intermittently or continuously and in either case salvages for the solid pack a substantial part of the salvage slices which conventionally is relegated to the crushed or juice pack.

Another object of the invention is to provide apparatus for treating pineapples whereby pineapples are transported from a sizing machine through one or more inspection and sorting stations and automatic loaders and resizing machines to an associated syruper and seamer by a series of conveyors and with a minimum of handling.

Other objects and advantages of the invention will appear hereafter in the detailed description, be particularly pointed out in the appended claims and be illustrated in the accompanying drawings, in which:

FIGURES 1, 2 and 3 are somewhat schematic side elevational views of adjoining sections of a preferred embodiment of the pineapple treating apparatus of the present invention.

FIGURES 4, 5 and 6 are plan views of the sections of the apparatus shown, respectively, in FIGURES 1, 2 and 3.

FIGURE 12 is a vertical sectional view taken along lines 12—12 of FIGURE 11;

FIGURE 13 is a fragmentary vertical sectional view on an enlarged scale taken along lines 13—13 of FIGURE 11 and FIGURE 13; and FIGURE 14 is a fragmentary rear elevational view taken along lines 14—14 of FIGURE 13.

Figure 7:
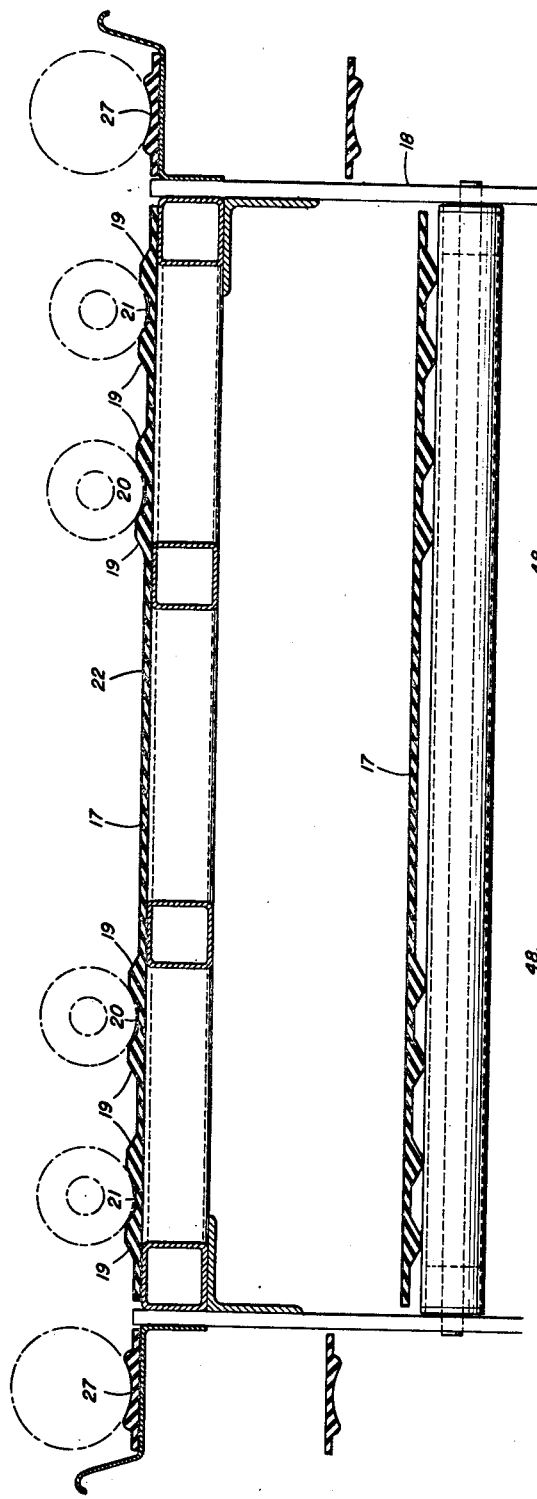
FIGURE 7 is a vertical sectional view on an enlarged scale taken along lines 7—7 of FIGURE 2.

Referring now in detail to the drawings in which like reference characters designate like parts, the improved apparatus of the present invention, while capable of use in treating other comestibles, is particularly designed for and will find its main application in the treatment of pineapples or like fruits or vegetables, herein termed collectively pineapples, which in the course of the preparation for canning are removed from their skins as cylinders and then cut into cylindrical slices.

As applied to pineapples, the apparatus departs from that conventionally used in a pineapple cannery in a number of respects but principally in providing means for resizing selected salvage slices, in order to recover for the solid pack a very substantial part of the edible fruit which heretofore has been consigned as salvage to the relatively low-priced crushed or juice pack. The principle involved in plural sizing, as opposed to the conventional single sizing, is both described and graphically illustrated in my copending application Ser. No. 63,451, filed Oct. 17, 1960, now Patent No. 3,036,920, issued May 29, 1962.

Briefly stated, this principle is that, because a pineapple is ovoidal or egg-shaped rather than cylindrical, the conventional single cylindrical cut determinative of the maximum possible recovery of edible fruit available to the solid pack wastes a very large part of the fruit within the skin and that this waste can be drastically reduced by subjecting a pineapple to a plurality of sizings, each of a size to extract a cylinder of edible fruit of substantially maximum diameter from one part of a pineapple.

The apparatus of this invention encompasses the treatment of a pineapple in a cannery from the point at which it is delivered from the field to the point at which cans filled with pineapples in slice, tidbit or other solid pack form are delivered to a syruper for syruping prior to vacuum-sealing and cooking. In the form illustrated as exemplary of the invention, the apparatus is designed to subject a pineapple to two sizings and is especially adapted to treat pineapples ranging in weight from 3 to 4¾ lbs. which constitute 60% or more of a normal year's pack and are ideal for sizing to 2½ and 2T size slice diameters.

The illustrated apparatus is comprised of a so-called Ginaca machine 1 for initially sizing, and coring and end-cutting a pineapple, the machine employed either being a conventional Ginaca machine or, and preferably, an improved machine, such as illustrated in my copending application Ser. No. 29,508 filed May 16, 1960, now Patent No. 3,244,209, issued Apr. 5, 1966, which is capable of a high rate of production on the order of 175 pineapples per minute. In the former case, a single line having one machine or treating component at each treating stage will suffice. However, if a high speed Ginaca machine is used, such as that of my copending application, it ordinarily will be expedient to duplicate the processing equipment in the line beyond the Ginaca machine to ensure that the output of the rest of the line will match that of the machine, especially if the treating operations in the rest of the line are in part performed manually. In order to exemplify both forms, the illustrated apparatus therefore includes the improved high speed Ginaca machine of my copending application and duplicates the associated process equipment in the line beyond the machine.

While the sizing and end cutting operations performed by the machine 1 of the apparatus of this invention are basically conventional, in accordance with the plural sizing principle embodied in the apparatus and enunciated in my copending application Ser. No. 63,451, the size of the sizing knife is selected to produce from each pineapple a fruit cylinder substantially the maximum diameter of the fruit in the waist portion of the pineapple and the end cutting is so controlled as to remove an insubstantial amount of edible fruit with the butt and crown cuts.

Whether a conventional Ginaca machine or the preferred improved machine of my copending application Ser. No. 29,508, the machine 1 is capable of performing automatically the basic functions of a Ginaca machine of sizing, coring and end cutting a pineapple and therefore is what has become known to the trade as a Ginaca machine and, as accordingly classified by the trade as such, is sometimes herein termed a "Ginaca machine" or simply a "Ginaca." The machine 1 here shown being the preferred machine of my copending application Ser. No. 29,508, now Patent No. 3,244,209, the details of the machine itself, as well as of a suitable feed conveyor 2 and associated loading conveyors 3 for delivering pineapples in sequence, crown end first, to the machine through a suitable centering device 6 at a rate to match the machine's potential output, will be found in that application.

As here shown in lesser detail, the machine, conventionally, has a tubular rotary sizing knife 4 by which pineapples as they enter the machine are cut cylindrically to remove as so-called shells, the side portions of their skins together with the meat or fruit left adhering thereto by the cylindrical cut, and a multi-barrelled turret 5 into a presented barrel of which each pineapple is deposited as it leaves the knife. Also, conventionally, the illustrated machine is mounted on an incline with the axes of its sizing knife and turret parallel and inclined downwardly from its feed end so as to obtain a gravity assist in forcing a pineapple through the throat of the knife into the turret. Associated with the turret 5 are cutters, a coring tube and an ejection plunger, not here shown, by which in the operating cycle of the turret the pineapples from the sizing knife are end or butt and crown cut, cored and finally ejected as cored fruit cylinders.

As in the usual pineapple cannery, the skin from the shells and ends cut off by the Ginaca machine are sent to the mill for processing for by-products, while the cores and the meat from the shells are sent separately for processing for the juice pack. To eliminate manual handling, these salvage materials are transported as appropriate to the mill and to the juice pack by conveyors which may be simply by the upper and lower flights of a single endless discharge conveyor 7 running crosswise of the apparatus in a pit provided for the purpose below the discharge end of the sizing machine 1. The cored fruit cylinders from the turret 5 in their turn are transported from the sizing machine 1, as they are discharged from the turret 5, to an inspection station 8 in which any wholly rotten or otherwise unusable fruit is culled out or removed and sent to the mill for by-product processing along with the skins, after which the remaining usable fruit is sliced into slices of the desired uniform thickness. Since in the illustrated apparatus the processing equipment in the processing line beyond the Ginaca machine is duplicated to accommodate the output of the machine, the fruit cylinders as they leave the machine are divided into two streams or lines, each for processing by one of the sets of equipment.

The desired division of the fruit cylinders at the Ginaca is readily accomplished by a fruit divider in the form of an open-ended trough 9 oscillatable or swingable in a limited arc to deposit the fruit on one of a pair of diverging chutes 10 each leading to one of a pair of transversely spaced, parallel belt or like endless conveyors 11. In order to divide the pineapples equally between the two streams, the divider chute is synchronized in movement with the turret 5 so as to direct alternate pineapples onto one of the chutes 11 and intervening pineapples onto the other. While numerous means suitable for obtaining the desired synchronization will suggest themeselves, it probably is most simply obtainable by mounting and spring-loading the chute in the manner of the switch element of the common push-button electric switch and using as the pusher, a pusher or linkage (not shown) drivably connected, through the driving cam (not shown) or sliding carriage 12 of the ejection plunger (not shown) to reciprocate with the latter. With such an arrangement, the divider trough 9 will be driven by its pusher in alternation against suitable spaced stops (not shown) limiting its swing each time a pineapple is discharged onto it from the turret 5. Since both the divider trough 9 and the discharge chutes 10 are here inclined in correspondence with the inclination of the sizing machine 1, the initial impetus given the pineapples by the ejection plunger will suffice to enable them to slide down the trough and chutes onto the conveyors 11.

Underlying the chutes 10, the conveyors 11 extend rearwardly to a pair of suitable, transversely spaced slicing machines 13, which preferably are single-cut slicing machines such as disclosed in my copending application, Ser. No. 857,035, filed Dec. 3, 1959, now Patent No. 3,136,348, issued June 9, 1964, and each of which slices the fruit cylinders delivered to it by one of the conveyors. Between the chutes 10 and the slicing machines 13, the advance flights of the conveyors 11 ride over and their return flights pass under an inspection table or platform serving as the initial inspection station 8 and of a length and width to enable inspectors at its opposite sides readily to observe and cull out or remove unusable fruit from the adjacent conveyor. To further simplify the operation, the conveyors 11 preferably extend forwardly sufficiently to partly overlie one or the other flight of the discharge conveyor 7 so that the unusuable fruit can be placed on their return flights and by suitable deflectors (not shown) be directed onto the appropriate flight of the discharge conveyor for transport with the skins to the mill for byproduct procesisng.

In the conventional cannery, it is the practice not only to cull out any unsuable fruit but also to trim eyes, skin traces or unusable portions from the remaining fruit before the fruit cylinders from the Ginaca machine are sliced. The trimming is done by a crew of operators using hand knives and it is the trimming that uses a large part of the total labor force required in the cannery and that, due to the bruising from handling and the practical impossibility of limiting the cuts to the unusable portions, is responsible for the preponderance of the fruit lost in processing. As indicated, no hand trimming is needed or contemplated in processing pineapples by the apparatus of this invention with the consequences that at this preslicing stage the usual fruit loss due to manual handling is eliminated and the labor force is only that required to inspect and cull out unusable fruit.

After the remaining, usable fruit has been sliced, the slices are moved, carried or conveyed to one or more inspection and sorting stations or areas, here duplicated at opposite sides of the line to handle the two streams of slices from the two slicing machines 13. At these stations the slices may be inspected and sorted either manually or automatically and in either case the slices of qualities suitable for packing as fancy, choice and standard grades are removed and loaded at sides of the line or elsewhere into open-topped cans. There are left the salvage slices which ordinarily would be consigned or, more appropriately, relegated to the relatively low-priced crushed and juice packs. Not so in the apparatus of this invention. Instead, the salvage slices, still in the two streams, in their turn are inspected and sorted and, while the rest are relegated to the crushed and juice packs, those having eyes, skin traces or other blemishes or imperfections only in their peripheral or edge portions are resized to remove or cut off the blemished portions and produce slices of smaller size or, if desired, tidbits of a quality suitable for packing as part of the solid pack.

As the graphic depiction of the geometry of the plural sizing process in my copending application Ser. No. 63,451 makes clear, the bulk of the salvage slices subjected to the resizing will be from the end portions of the fruit cylinders, on or in which, because of the ovoidal original shape of the pineapples, the initial sizing to substantially the maximum diameter of the fruit within the skins inside the wider waist portions almost inevitably leaves skin traces and portions of eyes. However, the resizing is equally applicable to any other salvage slices having imperfections only in their peripheral portions.

The inspection and sorting of the salvage slices may be performed automatically but ordinarily will be performed manually by operators, here stationed at opposite sides of the line at a salvage station, area or table 15. The resizing of the slices selected as suitable for the purpose in turn is performed on one or, here, a pair or plurality of sizing machines 16, one at each side of the line, each to accommodate one of the two streams in which the slices preferably move, flow or are transported along the line. The resizing machines illustrated in this application and forming part of this invention are counterpart to suit them for positioning at opposite sides of the line and, although differing in some details, are generally similar to the resizing machine disclosed in my copending application Ser. No. 63,451. As is the machine of that application, each of the illustrated resizing machines 16 is designed to act or operate in batches on salvage slices selected and fed to it from the table 15 and to make in each slice a cylindrical cut centered on or concentric with the presented slices, the diameter of the resizing being such relative to the initial sizing as to remove the skin traces, eyes and other blemishes in the peripheral portions of the slices taken from the end portions of the fruit cylinders from the Ginaca machine 1. Since in the aparatus of this invention the resizing machines 16 follow, in their positions along the processing line, most of the other processing equipment and in the manner in which they are fed or supplied, as well as in their positions, bear a definite relation to the other equipment, a detailed description of the resizing machines will follow that of the other equipment.

As mentioned earlier, first the fruit cylinders from the Ginaca machine 1 and later the slices from the slicing machines 13 move or flow in two streams or lines along the apparatus and, following slicing, are presented in sequence or turn for a main inspection and sorting to select and remove the fancy, choice and standard slices at one or more main inspection and sorting stations 14 and for inspection and sorting of salvage slices to select those suitable for resizing at one or more salvage stations 15, one of which will usually suffice. While it is possible to move the slices from the illustrated pair of slicing machines 13 by separate conveyor systems and these systems may end at the salvage table 15, an important feature of this invention is its conveyor system by which the slices from each slicing machine 13 are presented in turn for inspection and sorting at each of the following inspection and sorting stations, including the salvage station without interruption of the flow or movement of either stream as a whole and at a rate suited to match the output of the Ginaca machine 1. Since geared to the output of the Ginaca, this rate of movement of the streams will be about the same whether the inspection and sorting is performed manually or automatically, the difference in the manner in which the inspection and sorting is performed affecting, rather, the lengths of the individual stations and thus that of the apparatus as a whole. If the output of the Ginaca machine 1 is such as to require a plurality of sets of processing equipment for slicing and further processing the cored fruit cylinders, the processing equipment, as in the illustrated embodiment, will ordinarily be arranged in duplicate or counterpart sets at opposite sides of the apparatus with the equipment of each set in tandem or longitudinal alignment and the corresponding pieces of equipment of the two sets correspondingly positioned along the apparatus in transversely spaced relation. On the other hand, if a single set of processing equipment is adequate for the output of the Ginaca, the space required for the apparatus can be reduced by reducing its over-all length by a staggered arrangement of the processing equipment in which part of the equipment is positioned at each side of the apparatus.

Whether the apparatus has one or a plurality of sets of processing equipment, the slices from each slicing machine 13, and if, as here, there are a plurality, preferably from both machines, are presented to and moved, carried or conveyed past the inspection and sorting stations 14 and 15 by a single main or inspection belt or like endless conveyor 17 running from the slicing machine or machines the balance of the length of apparatus. Mounted on a supporting stand or frame 18 of suitable height and length and preferably made of rubber or like material, the main or inspection belt or conveyor is designed not only to move the fruit slices past the inspection stations but to facilitate both inspection and sorting at those stations. To this end, the conveyor, although generally flat, is interrupted by or has on it a plurality of transversely spaced endless grooves, troughs or concave seats or tracks formed by beadings or strips 19 integral with or vulcanized or otherwise fixed to and extending longitudinally of the conveyor. Each of the grooves of a curvature conforming or corresponding substantially to the cylindrical peripheries of the slices is adapted to accommodate or receive and support the slices undergoing processing and for this purpose preferably is erect or on edge. The number of grooves on the conveyor 17 will depend on the number of sets and arrangement of the processing equipment in the apparatus beyond the Ginaca machine 1. In any case, one of the grooves, here designated as 20 and termed a main or inspection groove, will be aligned with the discharge end of the slicing machine 13 of one set of processing equipment and, with the slices standing erect or on edge upon it, will serve to present the slices for inspection at the various stations. Should all of the processing equipment of the particular set be arranged in line, tandem or longitudinal alignment at one side of the apparatus, there will be on or fixed to the conveyor 17 adjacent one edge of the latter and between that edge and the associated or contiguous inspection strip 20 a second or sorting groove 21 for receiving slices selected or sorted from the output of the associated slicing machine on the main groove. Thus if, as in the illustrated embodiment, there are two sets or lines of processing equipment, each including a slicing machine 13, there will be on the conveyor 17 two or a pair of transversely spaced main or inspection grooves 20, each aligned with the output or discharge end of one of the slicing machines, and a corresponding number or pair of sorting grooves 21 bracketing the inspection grooves and each offset from one of the latter toward the contiguous or adjacent edge of the conveyor. This same arrangement at either side of the illustrated conveyor 17, of an inspection groove 20 aligned with the associated slicing machine 13 and a sorting groove 21 offset from the inspection groove toward the contiguous edge or side of the conveyor will serve, as well, for an apparatus having a single set of in-line processing equipment. However, in apparatus having a single set of processing equipment but with the pieces of equipment staggered on opposite sides of the apparatus, the conveyor will ordinarily have a pair of sorting grooves 21 adjacent opposite edges or sides of the conveyor 17 and an intermediate inspection strip 20 aligned with the single slicing machine 13. With at least an inspection groove 20 and a sorting groove 21 for each slicing machine 13 and the slices deposited upright or on edge on the inspection groove by the slicing machine, the slices on that groove are readily inspectable manually or automatically as they arrive at each station, and sorting or segregating from the main stream or lines of slices the slices suitable for processing at that particular station is simply a matter of manually or mechanically rolling, lifting or otherwise transferring the selected slices from the inspection groove to the associated or related sorting groove 21.

As the stream of slices from each slicing machine 13 progresses or moves down the line, the first slices to be selected from those on the inspection groove 20 and transferred to the associated sorting groove 21 at the forepart of the main station 14 will logically be the top quality clean fruit constituting or composed of the fancy and choice slices. After the fancy and choice slices have been transferred together to and later removed separately from the sorting groove 21, the standard slices in their turn are selected and transferred from the inspection to the sorting groove. On removal and transfer to the sorting groove 21 of the choice, fancy and standard quality slices, there will remain on the inspection groove 20 only the salvage slices, all of which, as previously mentioned, ordinarily would be relegated to the crushed and juice packs. Instead, in the apparatus of this invention, the salvage slices in their turn are inspected and those having eyes, skin traces or other blemishes only on or in their peripheral portions are transferred from the inspection groove 20 preliminary to resizing by the resizing machine 16 in that set or line of processing equipment. In addition to its grooves 20 and 21, the illustrated conveyor 17 has a substantially flat mid- or intermediate portion 22 of substantial width contained between or bracketed by the inspection grooves 20 for a purpose hereinafter to be described in connection with the detailed description of the resizing machines 16.

With inspection and sorting of the slices facilitated by the main conveyor 17 running beyond the slicing machines 13 to the end of the apparatus, there is the problem of handling the slices selected for the fancy, choice and standard packs after they have been removed from one of the inspection grooves 20 and transferred to one of the sorting grooves 21. Ordinarily there would be a common station at which slices of the three types were selected and operators at that station would manually pack the slices into cans. Although the grooving of the conveyor 17 would be advantageous even in such case, it is preferred to divide the main inspection and sorting station 14 into three substations, one for the fancy, another for the choice and a third for the standard slices, and to load the slices at each substation by machine or automatically rather than by hand or manually. Arranged in logical sequence following the initial area of the main station 14 in which the clean fruit is sorted out, to permit first sorting from the clean fruit and loading of the fancy slices, next loading of the choice slices and last inspection, sorting and loading of the standard slices, the fancy, choice and standard substations 23, 24 and 25, respectively, are alike in their processing of slices, once the latter have been sorted. Thus, each substation has as its processing equipment a can loading machine 26 for each stream of slices for loading the slices selected and sorted from that stream.

Arranged at one side or, for the disclosed plurality of streams or lines of slices from the slicing machines 13, in pairs at opposite sides of the apparatus, the can loaders or loading machines 26 are adapted automatically to load or fill cans with the slices sorted out and fed to them. Positioned itself close to the conveyor frame 18, each of the loading machines 26 will ordinarily be fed by a feed conveyor 27 conveniently supported on the conveyor frame and running parallel and close or adjacent to the side or edge of the main or inspection conveyor 17, the latter to facilitate transfer of the selected slices from the contiguous or adjacent sorting channel 21. Like the main conveyor 17, each feed conveyor 27 preferably is a rubber or like endless belt, and is longitudinally grooved, channeled or tracked to adapt it to support a single line of slices upright or on edge.

Among those suitable for the purpose, the type of loading machine preferred because of its relative simplicity and efficiency is that disclosed in my copending application, filed concurrently herewith. As pointed out in that application, the preferred loading machine 26 is capable of loading the slices fed to it into cans either as slices or, if desired, as tidbits into which the slices are cut in the course of loading. The preferred loading machine 26 is particularly suited for inclusion in the present apparatus, not only in enabling cans to be filled horizontally without preliminary change in the direction of flow or upright or on-edge position of the slices being loaded, but also in having an elevator 28 for lifting the filled cans to a high level.

To make use of the elevators 28 there is here mounted in an out-of-the-way position above the main conveyor 17 a supplementary or auxiliary conveyor 29 paralleling the main conveyor and leading from a position overlying the first of the loading machines 26, here the pair at the fancy slice substation 23, to a position substantially above one or more associated syrupers and double seamers indicated at 30. The elevators 28 of the several loading machines 26 in turn are projected to points above the auxiliary conveyor 29 from whence they can direct the loaded or filled cans onto that conveyor and there is provided adjacent the outlet end of the auxiliary conveyor a distribution system for and a gravity feed spiral track leading down to the double seamer or seamers 30, the distribution system and spiral track being of conventional types and indicated diagrammatically at 31 and 32, respectively. With this arrangement, slices, once placed on the feed conveyors 27 of the loading machines, can be loaded into cans and the filled cans delivered to a double seamer 30 for syruping and vacuum sealing, entirely automatically and without intervening manual handling. Moreover, since only the advance or upper flight 33 of the auxiliary conveyor 29 is involved in transporting the filled cans, its return or lower flight 34 is readily adapted automatically to supply the magazines (not shown) of the several loading machines 26 with empty cans from a suitable supply (not shown).

As previously mentioned, the inspection conveyor 17, after passing the main inspection and sorting station 14, runs next to the salvage station 15. As it arrived at the salvage station 15, the conveyor 17 will have its sorting grooves 21 empty, all of the slices previously placed thereon having been removed at one or another of the main inspection and sorting substations 23, 24 and 25. However, the inspection grooves 20 will still be partly filled with slices, these the salvage slices remaining after the fancy, choice and standard slices have been removed. It is from these salvage slices that those having imperfections only in or on their peripheral portions are selected manually or automatically for resizing by one or the other of the resizing machines 16. The balance of the salvage slices, suitable only for the crushed and juice packs, still in the inspection grooves 20, are carried by the main conveyor to the discharge end of the apparatus and in the illustrated embodiment are discharged or dumped into one or more discharge conveyors 35 conveniently running crosswise of the main conveyor in a common channel 36 in the floor below and to the rear of the stand 37 and having pusher or like suitable flights for carrying the non-selected slices away for further processing.

As mentioned earlier, each resizing machine 16 by which the salvage slices selected as suitable for the purpose are resized is quite similar to that illustrated as exemplary of suitable machines in my copending application Ser. No. 63,451. While, in the illustrated apparatus, two resizing machines are used, one at each side of the main conveyor 17 to serve separately the slices in the two streams, the machines are counterparts and a detailed description of one, that at the far side of the apparatus, as shown in FIGURE 6, will therefore suffice for both.

Figure 8:
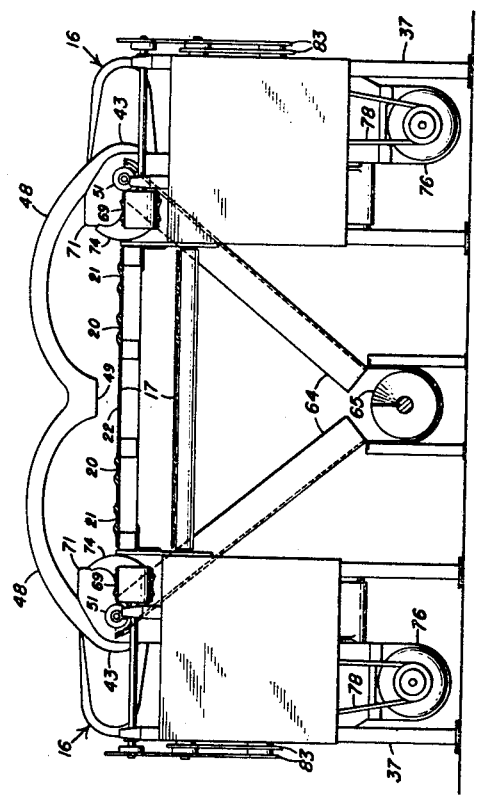
FIGURE 8 is a vertical sectional view taken along lines 8—8 of FIGURE 3 on a scale between that of FIGURES 3 and 7.

The resizing machine 16 exemplary of this invention is illustrated in detail in FIGURES 9–13. Mounted either on the supporting stand 18 of the main conveyor 17 or, as here, having its own stand or support 37, the resizing machine 16 includes a rotary, tubular or cylindrical resizing knife 38 mounted on the top of its stand preferably substantially on the level of and axially parallel to the main conveyor and having a cylindrical throat 39. The resizing knife 38 is similar to the sizing knife 4 of the Ginaca machine 1 in having a cutting edge 40 adapted to cut a cylindrical portion of cylinder from the presented fruit and in having the fruit cylinder pass through its throat but, to perform its intended resizing function, is of such smaller size or inside diameter relative to the sizing knife as to cut as a ring from the selected salvage slices presented to it the peripheral portions containing the skin traces, eyes or other imperfections which render them unsuitable for the solid pack after the initial sizing. Roller bearing or otherwise antifriction mounted for rotation in a bearing 41 fixed to the stand 37, the resizing knife 38, like that of the resizing machine illustrated in my application Ser. No. 63,451, may have its conventionally tapered leading or blade portion 42 partly exposed at the side and be provided with an associated chute for discharging the removed or cut off peripheral portions for further processing for the crushed and juice packs. However, it is now preferred to enclose the blade portions 42 at the side or circumferentially in a housing 43 of a rotary blower or impeller 44, the blades, fins or paddles 45 of which project radially from the resizing knife and are fixed for rotation therewith to a backing plate 46 surrounding and fixed to the knife and substantially closing the rear end of the housing. By directing the tangential spout or outlet 47 of its housing 43 upwardly and inwardly toward the main conveyor 17 at a tilt or inclination suitable for the applied force, the blower 45 is enabled to blow or project the peripheral portions removed or cut off from the salvage slices over the intervening inspection and sorting grooves 20 and 21 onto the substantially flat mid-portion 22 of the main conveyor for discharge onto the discharge conveyor or conveyors 35 so that they can be carried away for further processing with the unselected salvage slices. Although the flight of the peripheral portions of the selected slices from the blower 44 to the main conveyor 17 may be in the open, it ordinarily will be desirable to contain or confine the flight by a duct or tube, such as illustrated in FIGURE 8, which here serves the blowers of both machines and is curved to conform substantially to the free flight path of the peripheral portions from each, the illustrated duct being connected at its ends to the spouts 47 of the two blowers and having a downwardly directed outlet 49 at the center for discharging the peripheral portions onto the mid-portion 22 of the main conveyor.

Conceivably, the resizing knife 38 could be positioned in line with the adjoining sorting strip 21 on the main conveyor 17 and be fed directly by that conveyor with salvage slices selected and sorted onto that strip at the salvage station 15. However, to enable the resizing knife 38 to rotate or turn on or about its preferred horizontal axis, rather than on an inclined or vertical axis, and, as well, ensure a sufficient force for driving the selected slices through the knife, it usually will be found preferable to provide the resizing machine 16 with separate forcing means. In keeping, the resizing knife 38 in the illustrated embodiment is disposed at a side of the main conveyor 17 and the selected salvage slices are positively driven into and through the knife by a positive drive, which for a continuous operation might be one or more feed scrolls such as shown in my copending application Ser. No. 857,035, filed on Dec. 3, 1959, but for the batch operation for which the illustrated resizing machine is designed and which is more compatible with the practically unavoidable intermittent feeding of the selected slices to the machine, preferably is the head 50 of a reciprocating pusher or plunger 51.

Whether there is an intermittent or continuous feed to the resizing knife, it is necessary that the selected salvage slices be centered on the knife as they are presented for cutting. This purpose is served in the illustrated resizing machine by an open-topped, open-ended centering or guide trough 52 fixed to the top of the stand 37 in advance of and co-axial or concentric with the resizing knife 38 and of a cylindrical curvature corresponding to the peripheries of the selected slices before resizing. The centering action obtainable by the trough 52 is here further improved by attaching to the bracket 53 in which the trough is formed, at the rear or discharge end of the latter, a collar or sleeve 54 having a cylindrical bore 55 of the diameter of the selected slices before resizing and a forwardly flaring inlet 56 to receive and guide the slices from the trough into the bore. Positioned immediately in advance of and having its bore concentric or co-axial with the resizing knife 38, the guide or centering collar 54 effectively centers each slice on the knife as it is being cut. To improve the efficiency and preciseness of the cutting, the collar 54 also is provided with means for holding the presented slices against rotation during sizing preferably in the form of a plurality of thin, sharp-edged, triangular fins or ribs 57 fixed to the collar and instanding radially into the bore 55 substantially to the depth of the peripheral portions to be cut off in the resizing of the slices.

Figures 9, 11:
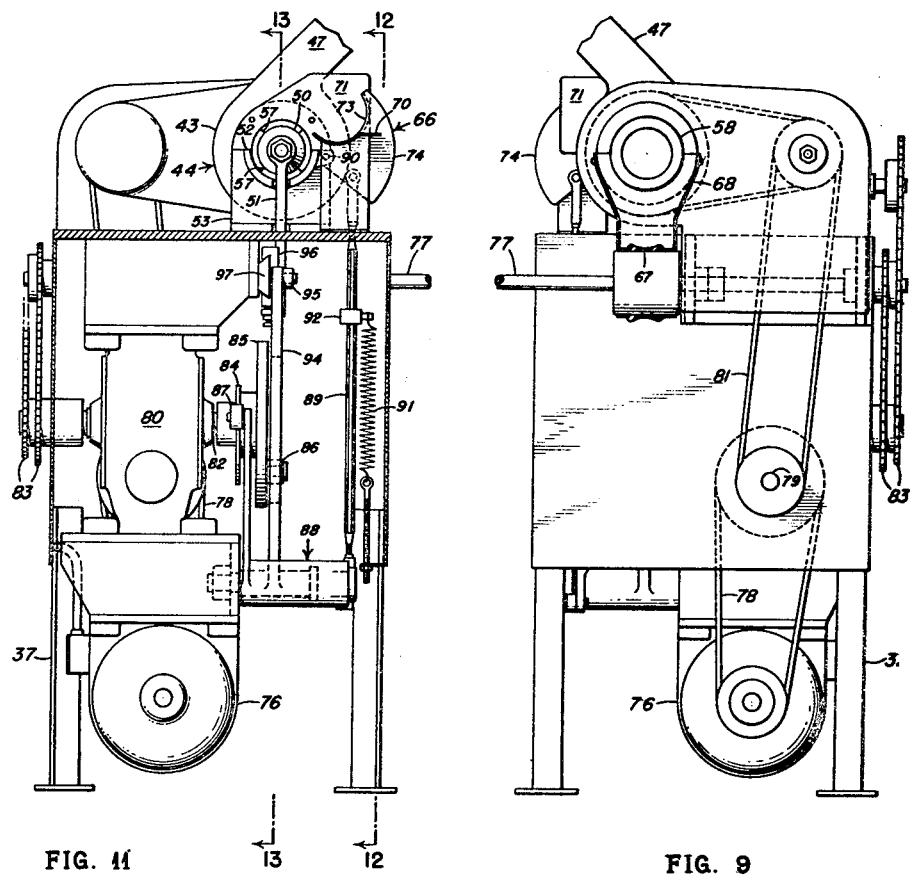
FIGURE 9 is an end elevational view of a preferred form of the resizing machine used in the apparatus of the preceding figures.
FIGURE 11 is a vertical sectional view of the preferred resizing machine taken along lines 11—11 of FIGURE 12.
Figure 10:
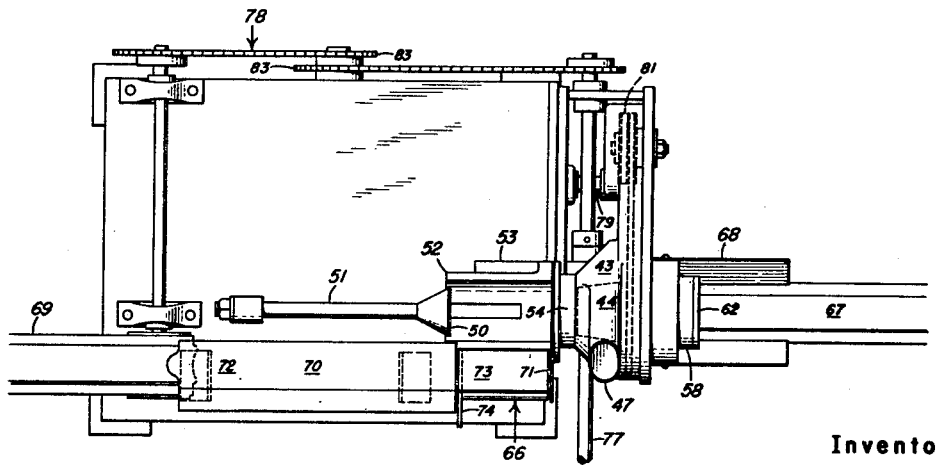
FIGURE 10 is a plan view of the machine of FIGURE 9.

As in the resizing machine of my copending application Ser. No. 63,451, the resized slices may be discharged directly from the throat 39 of the resizing knife 38 if they are to be packed or loaded into cans as slices. However, it sometimes will be desired to cut the resized slices into tidbits or chunks before packing and the illustrated resizing machine, accordingly, is adapted to produce either slices or tidbits. This is accomplished by the provision of a preferably barrel-shaped rearward extension 58 connected, attached or fixed against movement to the bearing or mounting 41 of the resizing knife 38 and having a cylindrical bore 59 concentric with and of the same diameter as the throat 39 of the resizing knife. Attached to and forming with the extension 58 a tidbit attachment are a plurality of knives or cutters 60 instanding radially into and preferably spaced uniformly about the bore 59. The knives 60 conveniently may be triangular with their cutting edges facing forwardly and inclined rearwardly to cut the slices inwardly from their peripheries and are of a depth and number to cut the slices into tidbits or chunks of the desired size. Conveniently seated in grooves or slots 61 in the wall of the bore 59 and held against displacement therefrom by suitable means, such as the illustrated retaining, locking or thrust ring 62, the knives may be made removable individually or as a unit with the thrust ring, either for repair or replacement or to convert the resizing machine to produce slices. However, it will ordinarily be preferred to make the tidbit attachment removable as a unit, as by bolting the extension 58 to the knife mounting 41, and, when slices are to be produced, to replace the attachment with an interchangeable slice extension or attachment 63, such as shown in FIGURES 9 and 12, which is like the tidbit extension 58 except that its bore is uninterrupted. By slotting the frusto-conical head 50 of the pusher 51 in correspondence with the knives 60, the pusher is enabled to push the resized slices completely through the knives when tidbits are desired or, with the slice attachment 63 in place, will simply push the resized slices, as such, through the bore 59 of that extension.

The tidbits produced by the resizing knife 38 and the knives 60 from the resized slices with the tidbit attachment in place are best adapted for bulk packing. In such case, a discharge chute 64, such as disclosed in FIGURE 8, can be used to direct the tidbits from the discharge end of the resizing knife to a suitable conveyor ultimately for transport by connecting conveyor means to the area of the plant in which the bulk packing facilities are located. While the return flight of the main conveyor 17 might be used as the proximate conveyor, the illustrated apparatus is designed, instead, to direct tidbits by the discharge chute 64 into a scroll or screw conveyor 65 positioned beneath the stand 18 of the main conveyor. The scroll conveyor 65 in turn discharges the tidbits into one or more pusher conveyors 66 conveniently running beside the discharge conveyor or conveyors 35 crosswise of the main conveyor in the channel 36 at the end of the stand. If, on the other hand, it is desired to pack the resized slices as slices, the tidbit knives 60 will be removed and the resizing knife will then discharge through the slice attachment 63 directly onto a discharge conveyor 67 which preferably is an endless rubber belt grooved, beaded or otherwise contoured or formed to conform to the peripheries of the resized slices so as to receive and support the slices upright or on edge. Guided into upright or on edge position on the discharge conveyor 67 by suitable means, such as the illustrated funnel-shaped guide 68 releasably attached to the extension 58, the resized slices may be carried on the conveyor directly to an additional can loader 26 similar to those at the sides of the main inspection and sorting station 14 but positioned in the line beyond the resizing machine 16. Leading between the resizing machine and the additional can loader or loading machine 26, the discharge conveyor 67 conveniently may be supported at its ends on the stands of the two machines.

Designed, as mentioned earlier, for batch rather than continuous resizing, as better suited for the practically unavoidable intermittent feeding of selected salvage slices from the salvage station 15, the resizing machine 16 has a feed conveyor 69 which, like those of the can loading machines 26, runs parallel to and at a side of the main conveyor 17 close to the latter's side or edge. Here conveniently supported at one end on the main frame 17 and at the other on the stand 37 of the resizing machine 16, the feed conveyor 69 like the discharge conveyor 67 preferably is a grooved, beaded or otherwise contoured or formed endless rubber belt, but with its curvature conforming to the peripheries of the selected salvage slices before resizing so as to receive and support those slices upright or on edge. Although the feed conveyor 69 might lead directly to the centering trough 52, the positive drive of the selected slices through the resizing knife 38 derivable from the reciprocating pusher 51 is preferred. Consequently, to accommodate the pusher 51, the feed conveyor 69 parallels but is offset to a side of or spaced transversely from the resizing knife 38 and feeds the selected salvage slices onto a longitudinally aligned supply or receiving trough 70, conforming in curvature to the peripheral contour of the selected slices and over which each slice is pushed by the force of the feed conveyor on succeeding slices until further progress is stopped by abutment of the end slice of the particular batch against a stop plate 71 fixed to and upstanding from the stand 37 at the inner end of the supply trough 70 and including the centering trough 52 as well as the supply trough within its transverse limits.

The supply trough 70 is made of two contiguous sections, one a fixed entry section 72 adjoining the discharge conveyor 67 and the other a transfer, dump or delivery section, slide or cradle 73. Instead of being fixed, the transfer section or cradle 73 is hingedly or swingably mounted on the stand 37 for hinging or swinging normal to the axis of the resizing knife 38 to dump, deposit, transfer or slide a batch of the selected slices onto the centering, guide or receiver trough 52. During the transfer the batch is contained and guided at its inner end by the stop plate 71 and at its outer end by an upstanding guide plate 74 integral with or fixed to the transfer section 73 and sweeping or interposed during the transfer between that section and the fixed entry section 72 so as to act as a temporary stop for the slices on the fixed section.

The desired batch or intermittent resizing of the selected slices may be conducted, as in the resizing machine of my application Ser. No. 63,451, by operating the feed and discharge conveyors 69 and 67 continuously by a driving connection to the main conveyor 17 or other suitable drive means, and intermittently operating the resizing knife 38, pusher 51 and transfer cradle 73 by a suitable motor in response either to means for automatically sensing the filling of the transfer cradle or to a switch in the circuit of the drive motor actuatable manually by one of the operators at the salvage station 15. However, it ordinarily will be at least as economical to operate all of the components of the resizing machine 16 continuously with the advantage that the means by which they are driven can be used to drive the feed and discharge belts 69 and 67 and, either alone or assisted, as a drive for the main conveyor 17. Consequently, while there has here been provided a manually actuatable switch 75 connected in the circuit of the electric or other suitable drive motor 76 of the resizing machine 16, it will be understood that, if the switch is used to operate the motor intermittently, the feed and discharge conveyors 69 and 67 will be otherwise driven and that in the illustrated form of the machine in which the drive motor is drivably connected to both the feed and discharge conveyors and to a drive pulley of the main conveyor, the shaft of which is indicated at 77, the switch 75 will ordinarily be a conveniently located main switch by which the entire apparatus is started and stopped.

The drive motor 76 preferably is located in the lower part of the stand 37 and, to enable it to drive the several components of the resizing machine 16, as well as the associated conveyors 17, 67 and 69, may be drivably connected by a V-belt or other suitable drive 78 directly to a shaft 77 serving as a combined driving shaft 79 of a housed worm or other suitable reduction gearing indicated at 80 and a take-off shaft for rotatably driving or turning the resizing knife 38 at suitable speed through a V-belt or other suitable driving connection 80. Driven off the driving shaft 79 through the worm or like reduction gearing 80 is a combined cam and crank shaft 82 extending or disposed at right angles or normal to the driving shaft and carrying in axially spaced relation at one side of the housed gearing 80 drive sprockets 83 for the several conveyors and at the other side a cam plate or disc 84 and a crank plate or disc 85, the latter mounting a preferably roller-carrying crank pin 86.

Of the two discs 84 and 85, the cam disc is an edge cam engaged on its periphery or edge by a roller 87 at one end of a cam follower 88 in the form of a bell crank pivoted to the stand 37, the other end of which is connected to the transfer cradle 73 by a link 89 for swinging the cradle about the hinge pin 90 hingedly connecting it to the stand. The link 89 is pivotally connected at its extremities to the transfer cradle 73 and the bell crank 88 and conveniently both is adjustable in length to determine the limits of swing of the cradle under force of the bell crank and is spring loaded by a spring 91 of adjustable tension anchored at one end to the stand 37 and at the other to a collar 92 settable in selected position axially of the link, the spring loading ensuring constant engagement of the roller 87 with the cam or cam disc 84. The crank pin 86 rides in an arcuate slot 93 in a lever 94 pivoted at its lower end to the stand 37 and connected at its upper end by a link 95 to a carriage 96 slidably mounted on a V- or like suitable slide or track 97 fixed to the stand, the carriage itself mounting the pusher 51.

Drivably connected in the above manner to the driving motor 76, the resizing knife 38 and the feed and discharge conveyors 69 and 67 of the resizing machine 16, as well as the main conveyor 17, will be driven constantly or continuously so long as the motor is operating. The remaining driven components of the resizing machine 16, the transfer cradle 73 and the pusher 51, on the other hand, will be driven cyclically by the motor 76 through the intervening cam 84 and crank 85 so that in timed sequence the cradle will swing to transfer its batch of selected salvage slices to the centering trough 52 and the pusher will push the batch through the resizing knife 38.

The exact sequence or cycle of operation of the transfer cradle 73 and the pusher 51 in the illustrated resizing machine 16 is readily perceivable from FIGURE 12. The relative positions of the cam 84 and its follower 88 and the crank pin 86 and associated lever 94 in the normal or initial positions of the cradle 73 and the pusher 51 are as indicated in that figure. With the combined cam and crank shaft 82 turning clockwise as viewed in that figure, rotation of the cam and crank discs 84 and 85 by that shaft from the positions shown will first swing the transfer cradle 73 to transfer position and start its return or reverse swing back to initial position. During this interval the crank pin 86 rides in the intermediate portion of the arcuate slot 93 and, since that portion at this time is substantially concentric with the crank 85, the pusher will dwell or remain in its normal or retracted position. However, as the cradle continues its return or reverse swing to normal position, the pusher will begin its power or advance stroke. The cradle 73 having returned to initial position, the power stroke of the pusher will continue until it has pushed the selected slices completely through the resizing knife 38 and the fixed extension 58, the position of the head 50 of the pusher at the end of the power stroke being shown in FIGURE 13. The pusher 51 then is reversed in direction and started on its return or retract stroke until it, too, returns to initial position, completing the cycle. If, as in the illustrated embodiment, the drive motor 76 is operated constantly during operation of the apparatus, the operating cycles of the transfer cradle 73 and the pusher 51 will be repeated periodically, the cradle each time transferring to the centering trough 52 the batch of selected salvage slices fed to it over the fixed entry section 72 by the feed conveyor 69 and the pusher pushing or forcing the presented batch on the trough through the centering ring 54, the resizing knife 38 and the extension 58 and ejecting from the latter either resized slices or tidbits cut therefrom, depending on whether the tidbit cutters 62 are then in place.

Summarizing the operations of the apparatus in the sequence in which they occur, pineapples are initially fed to the Ginaca machine 1 and are there sized to a cylinder of substantially the maximum diameter of the fruit within the waist portions of their skins. Subsequently end cut but with the depths of the butt and crown cuts limited to remove a minimum of fruit, the cored fruit cylinders, usually with skin traces and eyes in their end portions because of the maximum diameter sizing, are ejected from the turret 5 of the Ginaca machine 1 onto the fruit divider 9 and, divided thereby into two streams, slide down the chutes 10 onto the slicer conveyors 11. There the cylinders are subjected to a preliminary inspection and any that are wholly rotten or unusable are removed and sent to the mill for byproduct processsing. The remaining cylinders are fed or conducted by the conveyors 11 to the slicing machines 13 and sliced into slices of the desired thickness. In the interim, the shells from the pineapples have been eradicated at the Ginaca 1 and the fruit from the shells has been directed to the crushed and juice packs, while the skins and wholly rotten fruit are being sent to the mill for by-product processing.

In the main processing line, the slices as they leave the slicing machines 13 are deposited in the inspection grooves or tracks 20 of the main conveyor 17 and carried thereby at a speed appropriate to match the output of the Ginaca 1, first to the main inspection and sorting station 14. At the forepart of that station, the fancy and choice slices are transferred together as clean fruit to the adjoining sorting grooves or tracks 21 and, as they enter the fancy substation 23, the fancy slices are sorted out and transferred from the sorting strips 21 of the main conveyor 17 to the feed belts 27 of the related can loaders 26. Later the remaining clean slices are transferred similarly as they reach the choice substation 24. Further along, the standard slices are transferred at their substation 25 from the inspection grooves 20 across the sorting grooves 21 to the feed belts 27 of their can loaders 26. Loaded by their respective loaders, the fancy, choice and standard slices are elevated to the auxiliary conveyor 29 by which they are carried to the distribution system 31 of the double seamer or seamers 30 for syruping and vacuum sealing.

The remaining or salvage slices on the main conveyor 17 are carried further along the line to the salvage station 15 where those slices having only peripheral imperfections, which in the main will be the slices from end portions of the initial cylinders, are sorted out and placed on the feed conveyors 69 of the resizing machines 16 for resizing by those machines and subsequent packing as part of the solid pack in either slice or tidbit form. Left on the main conveyor 17, the unselected salvage slices are carried thereby to the end of the apparatus and dumped into suitable discharge conveyors for transport for further processing and ultimate canning as parts of the crushed and juice packs.

From the above detailed description, it will be apparent that there has been provided apparatus for treating pineapples which improves on the conventional apparatus both as a whole and in its individual components and is capable of markedly increasing the fruit recovery for the relatively high priced solid pack and at the same time drastically reducing the labor required in the processing. It should be understood that the described and disclosed embodiment is merely exemplary of the invention and that all modifications are intended to be included which do not depart from the spirit of the invention or the scope of the claims.

Having described my invention, I claim:

1. Apparatus for treating pineapples, comprising means for sizing pineapples, means for slicing said sized pineapples into slices, and means for resizing selected of said slices having imperfections in peripheral portions thereof for removing said imperfections.

2. Apparatus for treating pineapples, comprising a machine for sizing, end cutting and coring pineapples into fruit cylinders, means for slicing said fruit cylinders into slices, and means for resizing selected slices having imperfections in their peripheral portions to remove said imperfections.

3. Apparatus for treating pineapples, comprising means for sizing, end cutting and coring pineapples into fruit cylinders, means for slicing said cylinders into slices, means for resizing selected of said slices having imperfections in peripheral portions thereof for removing said imperfections, said several means being arranged in sequence, and conveying means for conveying cylinders from said first-named means to said slicing means and slices from said slicing means to said resizing means.

4. Apparatus for treating pineapples, comprising means for sizing, end cutting and coring pineapples into fruit cylinders, means for slicing said fruit cylinders into slices, means for resizing selected of said slices having imperfections in peripheral portions thereof for removing said imperfections, and means extending from said slicing means to said resizing means for conveying said selected slices therebetween.

5. Apparatus for treating pineapples, comprising means for sizing, end cutting and coring pineapples into fruit cylinders, means for slicing said fruit cylinders into slices, a station for inspection of and sorting from said slices those of a quality suitable for packing as fancy, choice and standard slices, a station beyond said first station for inspection and sorting from salvage slices those having imperfections only in their peripheral portions, means for resizing said selected salvage slices to remove said imperfections, and continuous means for conveying slices from said slicing means past said stations to said resizing means.

6. Apparatus for treating pineapples, comprising means for sizing, end cutting and coring pineapples into fruit cylinders, means for slicing said fruit cylinders into slices, conveying means for conveying said slices beyond said slicing means, a plurality of inspection and sorting stations arranged along said conveying means, and means adjacent said second station for resizing slices selected thereat as having imperfections only in their peripheral portions to remove said imperfections.

7. Apparatus for treating pineapples, comprising means for sizing, end cutting and coring pineapples into fruit cylinders, means for slicing said cylinders into slices, conveying means for conveying said slices beyond said slicing means, a plurality of inspection and sorting stations arranged in sequence along the path of said conveying means for inspecting said slices and sorting therefrom slices of particular qualities, and means associated with each of said stations for processing slices selected thereat, said last-named means including means for resizing certain of said slices having imperfections in peripheral portions thereof for removing said imperfections.

8. Apparatus for treating pineapples, comprising means for sizing, end cutting and coring pineapples into fruit cylinders, means for slicing said cylinders into slices, a plurality of inspection and sorting stations arranged in sequence beyond said slicing means for enabling said slices to be selected and sorted by quality, means associated with certain of said stations for loading fruit selected thereat into open-topped cans, means associated with one of said stations for resizing before loading selected of said slices having imperfections in peripheral portions thereof for removing said imperfections, conveying means leading from said several loading means to a distribution system for syruping and vacuum sealing means, and means connected to each of said loading means for depositing cans loaded thereat on said last-named conveying means.

9. Apparatus for treating pineapples, comprising means for sizing, end cutting and coring pineapples into fruit cylinders, means for slicing said cylinders into slices, a plurality of inspection and sorting stations arranged in sequence beyond said slicing means for enabling said slices to be selected and sorted by quality, means associated with certain of said stations for loading fruit selected thereat into open-topped cans, means associated with one of said stations for resizing before loading selected of said slices having imperfections in peripheral portions thereof for removing said imperfections, conveying means overlying and leading from said loading means to a distribution system for syruping and vacuum sealing means, and elevating means connected to each of said loading means for depositing cans loaded thereat on said last-named conveying means.

10. Apparatus for treating pineapples, comprising means for sizing, end cutting and coring pineapples into fruit cylinders, means for slicing said cylinders into slices, conveying means for conveying said slices beyond said slicing means, a plurality of inspection and sorting stations arranged in sequence along said conveying means for enabling slices thereon to be inspected and sorted according to quality, means for loading fruit selected and sorted at said stations, and means for resizing prior to loading slices selected at certain of said stations as having imperfections in peripheral portions thereof for removing said imperfections, said loading and resizing means being arranged at sides of said conveying means adjacent the stations associated therewith.

References Cited
UNITED STATES PATENTS

| | | | |
|---|---|---|---|
| 1,415,458 | 5/1922 | Lewis | 146—6 |
| 1,671,723 | 5/1928 | Jagenburg | 146—6 |
| 2,092,773 | 9/1937 | Nordquist et al. | 53—123 |
| 2,175,170 | 10/1939 | Hjelte | 146—6 |

W. GRAYDON ABERCROMBIE, Primary Examiner